United States Patent
Chang et al.

(10) Patent No.: US 8,823,949 B2
(45) Date of Patent: Sep. 2, 2014

(54) MEASUREMENT APPARATUS

(75) Inventors: Chih-Kuang Chang, New Taipei (TW); Wen-Dong Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 337 days.

(21) Appl. No.: 13/271,356

(22) Filed: Oct. 12, 2011

(65) Prior Publication Data

US 2012/0192661 A1 Aug. 2, 2012

(30) Foreign Application Priority Data

Jan. 28, 2011 (CN) .......................... 2011 1 0031067

(51) Int. Cl.
*G01B 11/24* (2006.01)
(52) U.S. Cl.
CPC ..................................... *G01B 11/24* (2013.01)
USPC .......................................................... 356/601
(58) Field of Classification Search
None
See application file for complete search history.

(56) References Cited

U.S. PATENT DOCUMENTS

| | | | | |
|---|---|---|---|---|
| 4,363,118 A * | 12/1982 | Roach et al. | ................ | 369/53.13 |
| 5,546,179 A * | 8/1996 | Cheng | ............................. | 356/73 |
| 6,064,759 A * | 5/2000 | Buckley et al. | ............... | 382/154 |
| 6,473,186 B2 * | 10/2002 | Kawasaki et al. | ............. | 356/512 |
| 6,525,810 B1 * | 2/2003 | Kipman | ...................... | 356/237.1 |
| 6,798,513 B2 * | 9/2004 | Abraham | ....................... | 356/369 |
| 6,842,025 B2 * | 1/2005 | Gershenzon et al. | .... | 324/750.19 |
| 6,954,267 B2 * | 10/2005 | Abraham et al. | .......... | 356/237.2 |
| 7,310,162 B2 * | 12/2007 | Morris-Jones | ................ | 358/1.15 |
| 7,645,773 B2 * | 1/2010 | Gillespie et al. | .............. | 514/311 |
| 7,826,048 B2 * | 11/2010 | Holecek et al. | ............ | 356/237.2 |
| 2003/0210329 A1 * | 11/2003 | Aagaard et al. | ............... | 348/159 |

* cited by examiner

*Primary Examiner* — Gregory J Toatley
*Assistant Examiner* — Juan D Valentin, II
(74) *Attorney, Agent, or Firm* — Novak Druce Connolly Bove + Quigg LLP

(57) ABSTRACT

A measurement apparatus includes a pedestal, a supporting tray, a first movable base, a first measuring assembly, a second movable base, a second measuring assembly, a third movable base, a third measuring assembly, and a console. The supporting tray is rotationally fixed in the pedestal and can be rotated to position a workpiece at different angles to ensure that images of all portions and surfaces needing to be measured can be captured.

7 Claims, 3 Drawing Sheets

MEASUREMENT APPARATUS

BACKGROUND

1. Technical Field

The present disclosure relates to measurement apparatuses, particular to a measurement apparatus for measuring an object.

2. Description of Related Art

An image measurement apparatus is often applied to measure objects, such as a workpiece, for example. The image measurement apparatus includes a measuring assembly, a movable base, a platform, and a console with a display device and a computer. The image measurement apparatus measures workpieces using images of the workpieces captured by the measuring assembly. However, the base, the console, and the platform are usually in fixed positions, requiring that the workpiece be repeatedly repositioned to get measurements of different portions of the workpiece, which is inconvenient and can add to the cost of manufacture. What is needed, therefore, is another image measurement apparatus to overcome the limitations described.

DETAILED DESCRIPTION

Figure 1:
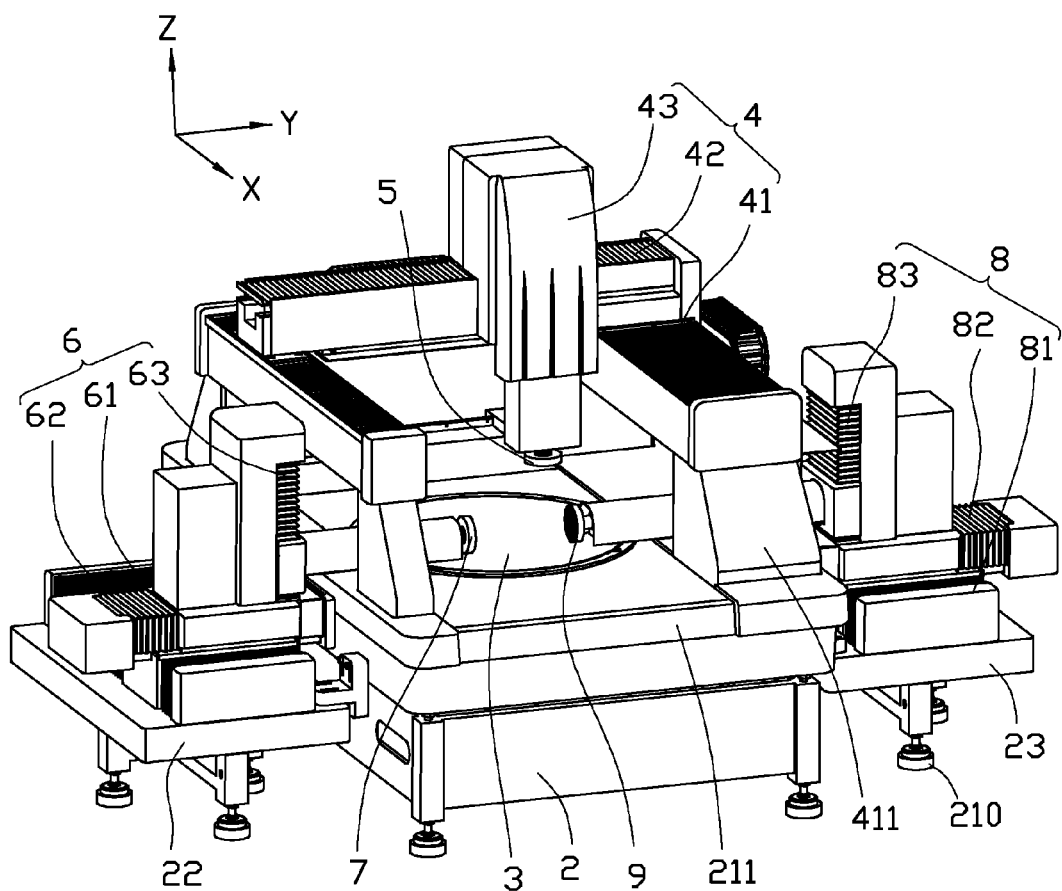
FIG. 1 is a perspective view of one embodiment of a measurement apparatus.
Figure 2:
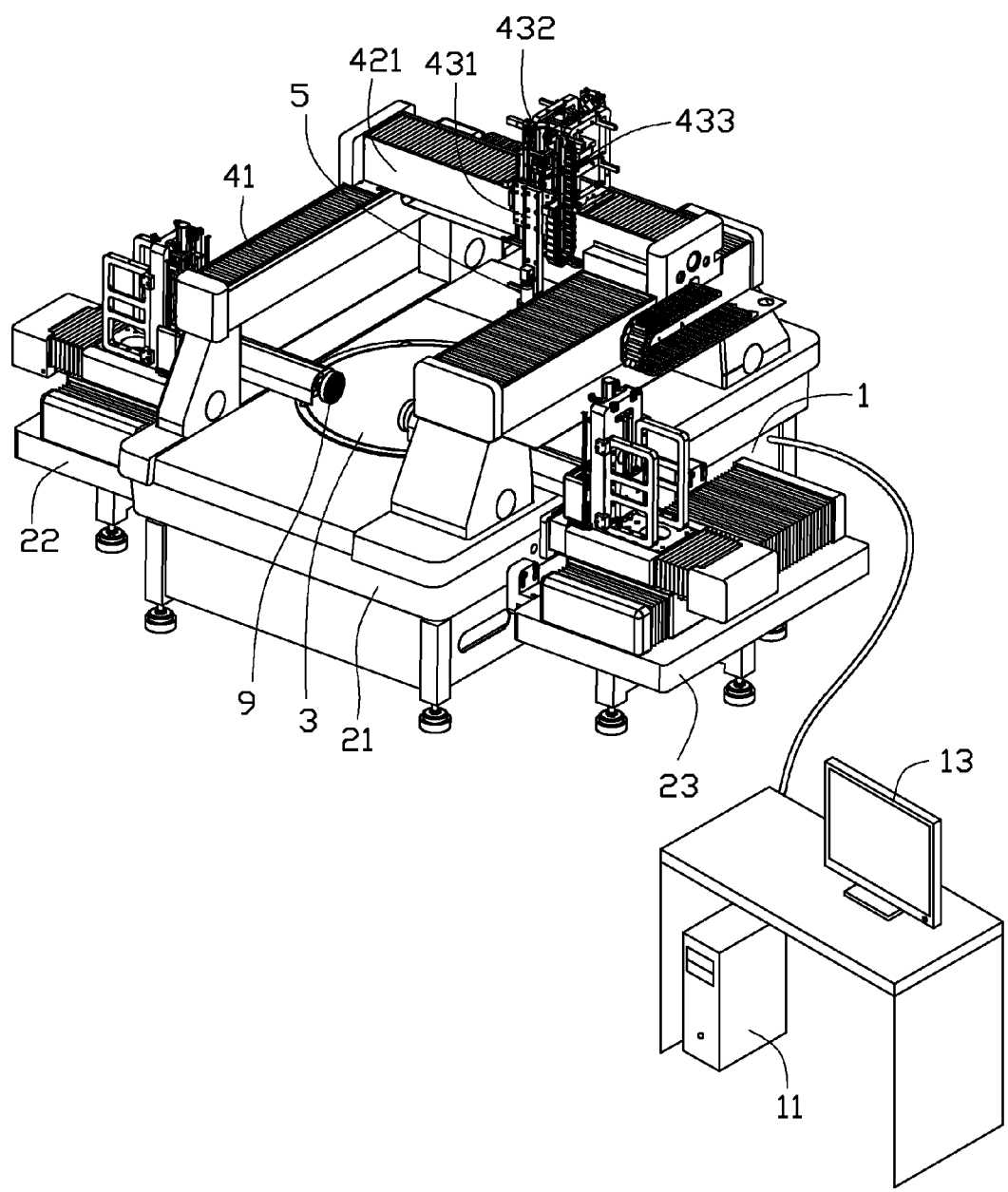
FIG. 2 is a perspective view of the measurement apparatus shown in FIG. 1 connected to a computer and a display device.
Figure 3:
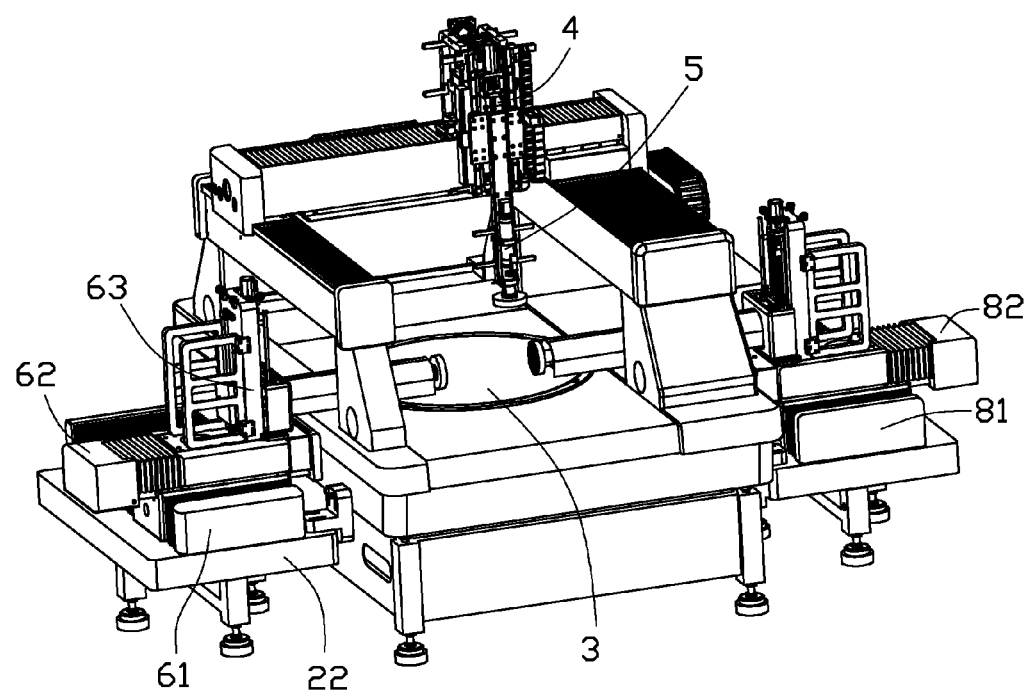
FIG. 3 is similar to FIG. 2 but showing another aspect of the measurement apparatus.

FIGS. 1-3 show an exemplary measurement apparatus used to measure dimensions of an object. The object may be a workpiece, an electronic component, or a mechanical component, for example. The measurement apparatus includes a console 1, a pedestal 2, a supporting tray 3, a first movable base 4, a first measuring assembly 5 fixed on the first movable base 4, a second movable base 6, a second measuring assembly 7 fixed on the second movable base 6, a third movable base 8, and a third measuring assembly 9 fixed on the third movable base 8. The supporting tray 3, the first movable base 4, the second movable base 6, and the third movable base 8 are fixed on the pedestal 2, and connected to the console 1, so that the all can be controlled by operating a computer 11 of the console 1. Each of the first measuring assembly 5, the second measuring assembly 7, and the third measuring assembly 9 may be either one of a Charge Coupled Device (CCD) lens or a Complementary Metal Oxide Semiconductor (CMOS) lens. The first measuring assembly 5, the second measuring assembly 7, and the third measuring assembly 9 are all for aiming at and further capturing images of various measuring portions/surfaces of the object.

The pedestal 2 includes a main holder 21, a first holder 22, and a second holder 23. The first holder 22 and the second holder 23 are positioned on two opposite sides of the main holder 21. The main holder 21 includes a platform 211. A plurality of supports 210 are positioned under the platform 211, the first holder 22, and the second holder 23.

The supporting tray 3 for supporting the object is rotationally fixed in the platform 211, and is coplanar with the platform 211. In this exemplary embodiment, the supporting tray 3 is a round and transparent glass board. The supporting tray 3 includes a light (not shown) inside.

The first movable base 4 includes two first tracks 41, a first crossbeam 42, and a first supporting portion 43.

The two first tracks 41 includes at least two supporting blocks 411. The supporting blocks 411 are used to support the two first tracks 41 on the platform 211. The two first tracks 41 are parallel to an X-axis of the platform 211, when the three spatial axes are aligned as shown in FIG. 1.

The first crossbeam 42 has a bridge-link structure and is slidably mounted on the two first tracks 41, parallel to a Y-axis of the platform 211, when the three spatial axes are aligned as show in FIG. 1. The first crossbeam 42 can slide relative to the supporting tray 3 on the two first tracks 41 along the X-axis of the platform 211.

The first supporting portion 43 is slidably mounted on the first crossbeam 42 for supporting the first measuring assembly 5. The first supporting portion 43 includes a rail 431, a motor 432, and a shaft 433. The motor 432 may be operated by the computer 11 of the console 1. The shaft 433 is connected to the motor 432 and the measuring assembly 5, and is slidably mounted on the rail 431. When the motor 432 rotates the shaft 433, the shaft 433 slides the first measuring assembly 5 relative to the supporting tray 3 on the rail 431 along a Z-axis of the platform 211, when the three spatial axes are aligned as shown in FIG. 1.

Each of the first tracks 41, the first crossbeam 42, and the first supporting portion 43 has a raster scale (not shown) for measuring locations of the first measuring assembly 5, the second measuring assembly 7, and the third measuring assembly 9. The measurement results can be sent to the computer 11, so that the computer 11 may precisely control movements of the first measuring assembly 5, the second measuring assembly 7, and the third measuring assembly 9.

The second movable base 6 is similar to the first movable base 4 in structure. The second movable base 6 includes a second track 61, a second crossbeam 62, and a second supporting portion 63. The second track 61 is fixed on the first holder 22, parallel to the X-axis of the platform 211. The second crossbeam 62 is slidably mounted on the second track 61, parallel to the Y-axis of the platform. The second supporting portion 63 is similar to the first supporting portion 43 in structure and is slidably mounted on the second crossbeam 62. The second measuring assembly 7 is slidably mounted on the second supporting portion 63 above the supporting tray 3 and is parallel to the Y-axis of the platform 211. The second measuring assembly 7 can move relative to the supporting tray 3 on the second supporting portion 63 along the Z-axis of the platform 211.

The third movable base 8 has the same structure with the second movable base 6. The third movable base 8 includes a third track 81, a third crossbeam 82, and a third supporting portion 83. The third track 81 is parallel to the X-axis of the platform 211. The third crossbeam 82 is slidably mounted on the third track 81, parallel to the Y-axis of the platform. The third supporting portion 83 is slidably mounted on the third crossbeam 82. The third measuring assembly 9 is slidably mounted on the third supporting portion 83, parallel to the Y-axis of the platform 211 and above the supporting tray 3. The third measuring assembly 9 can move relative to the supporting tray 3 on the third supporting portion 83 along the Z-axis of the platform 211.

The computer 11 is for controlling the apparatus to start the measurement of the object, and is for calculating dimensions, flatness, and/or other parameters of the object on the basis of the images captured by the first measuring assembly 5, the second measuring assembly 7, and the third measuring assembly 9. The console 10 further has a display device 13, a mouse (not shown) and a keyboard (not shown) connected to the computer 11. The display device 13 is for showing results computed by the computer 11.

A method for performing the measurement process follows. An object is placed on and supported by the supporting tray 3. The supporting tray 3 light is turned on to illuminate each measuring portion/surface of the object. The apparatus is activated and the first movable base 4, the second movable base 6, and the third movable base 8 are driven to move along the X-axis, Y-axis, and/or Z-axis of the platform 211, until the first measuring assembly 5, the second measuring assembly 7, and the third measuring assembly 9 aim at those measuring portions/surfaces of the object in view. The first measuring assembly 5, the second measuring assembly 7, and the third measuring assembly 9 capture images of each measuring portion/surface in view, and simultaneously send the images to the computer 11 for a computing by the computer 11. Then, for any measuring portions/surfaces that were not initially in view can be brought into view by rotating the supporting tray 3 to any of different specified angles.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A measurement apparatus, comprising:
   a pedestal comprising a platform;
   a supporting tray rotationally fixed in the platform;
   a first movable base slidably mounted on the pedestal;
   a first measuring assembly slidably mounted on the first movable base, configured to move relative to the supporting tray along a X-axis, Y-axis and/or Z-axis of the pedestal;
   a second movable base slidably mounted on the pedestal;
   a second measuring assembly slidably mounted on the second movable base, configured to move relative to the supporting tray along the X-axis, Y-axis and/or Z-axis of the pedestal;
   a third movable base slidably mounted on pedestal;
   a third measuring assembly slidably mounted on the third movable base, configured to move relative to the supporting tray along the X-axis, Y-axis and/or Z-axis of the pedestal; and
   a console, configured to control the first measuring assembly, the second measuring assembly, and the third measuring assembly aiming at various measuring surfaces of an object supported on the supporting tray, and determining measurements of the measuring surfaces by measuring images of each measuring surface;
   wherein the first movable base comprises two first tracks, a first crossbeam, and a first supporting portion, the two first tracks are positioned on the platform, the first crossbeam is slidably mounted on the two first tracks and can move along the X-axis of the platform, the first supporting portion is slidably mounted on the first crossbeam and can move along the Y-axis of the platform, the first measuring assembly is slidably mounted on the first supporting portion and can move along the Z-axis of the platform;
   the second movable base is positioned on one side of the platform, the second movable base comprises a second track, a second crossbeam slidably mounted on the second track, and a second supporting portion slidably mounted on the second crossbeam, the second crossbeam can move along the X-axis of the platform, the second supporting portion can move along the Z-axis of the platform, the second measuring assembly which is slidably mounted on the second supporting portion, can move along the Y-axis of the platform.

2. The measurement apparatus of claim 1, wherein the supporting tray can be rotated to position the object at different specified angles, to ensure the first measuring assembly, the second measuring assembly, and the third measuring assembly can aim at different measuring surfaces of the object.

3. The measurement apparatus of claim 1, wherein the first measuring assembly, the second measuring assembly, and the third measuring assembly are positioned above the supporting tray, and can move along the X-axis, Y-axis and Z-axis of the platform.

4. The measurement apparatus of claim 1, wherein the third movable base is positioned on the opposite side of the platform, the third movable base comprises a third track, a third crossbeam slidably mounted on the third track, and a third supporting portion slidably mounted on the third crossbeam, the third crossbeam can move along the X-axis of the platform, the third supporting portion can move along the Z-axis of the platform, the third measuring assembly which is slidably mounted on the third supporting portion, can move along the Y-axis of the platform.

5. The measurement apparatus of claim 4, wherein the first supporting portion comprises a rail, a motor, and a shaft, the motor is operated by the console, the shaft is connected to both the motor and the first measuring assembly slidably mounted on the rail, the motor drives the shaft rotate, to drive the first measuring assembly slide relative to the supporting tray on the rail along the Z-axis of the platform, both the second supporting portion and the third supporting portion have the same structure as the first supporting portion.

6. The measurement apparatus of claim 1, wherein the console comprises a computer and a display device, the computer is capable of controlling the measurement apparatus to start the measurement of the object, and calculating results on the basis of the images captured, and the display device is capable of showing the results computed by the computer.

7. The measurement apparatus of claim 1, wherein the pedestal further comprises at least one supports operable to support the pedestal.

* * * * *